United States Patent [19] [11] 3,787,768

Kubota et al. [45] Jan. 22, 1974

[54] INSPECTION APPARATUS FOR PRINTED CIRCUIT BOARDS

[75] Inventors: Tadashi Kubota, Katano; Michio Kato, Hirakata, both of Japan

[73] Assignee: Matsushita Electric Industrial Co. Ltd., Osaka, Japan

[22] Filed: Dec. 21, 1971

[21] Appl. No.: 210,457

[30] Foreign Application Priority Data

| | | |
|---|---|---|
| Dec. 25, 1970 | Japan | 45-130069 |
| Dec. 25, 1970 | Japan | 45-141212 |
| Dec. 25, 1970 | Japan | 45-141213 |
| Dec. 25, 1970 | Japan | 45-141214 |
| Dec. 25, 1970 | Japan | 45-141215 |

[52] U.S. Cl. .......... 324/158 F, 324/73 PC
[51] Int. Cl. .......... G01r 31/28
[58] Field of Search ......324/158 F, 158 P, 158 R, 324/73 PC, 73 R

[56] References Cited

UNITED STATES PATENTS

| | | | |
|---|---|---|---|
| 2,887,622 | 5/1959 | Rayburn et al. | 324/158 P |
| 3,437,929 | 4/1969 | Glenn | 324/158 P |
| 3,654,585 | 4/1972 | Wickersham | 324/158 F |
| 3,412,333 | 11/1968 | Frick et al. | 324/158 F |

*Primary Examiner*—Rudolph V. Rolinec
*Assistant Examiner*—Ernest F. Karlsen
*Attorney, Agent, or Firm*—Stevens, Davis, Miller & Mosher

[57] ABSTRACT

A printed circuit board inspection apparatus for automatically inspecting the electrical continuity of a printed circuit printed on and through-holes formed in a substrate board according to a predetermined program prior to mounting electric parts in the through-holes to form a desired electric circuit, which is so constructed as to ensure the electrical continuity of the printed circuit printed on and through-holes formed in a substrate board.

6 Claims, 7 Drawing Figures

INSPECTION APPARATUS FOR PRINTED CIRCUIT BOARDS

This invention relates to a printed circuit board inspection apparatus capable of performing an electrical continuity test of a printed circuit printed on and through-holes formed in a substrate board quickly and automatically according to a predetermined program prior to assembling complex electronic component parts, and more particularly to such an inspection apparatus in which the electrical continuity of the component parts from contactor needles to terminals is ensured and which therefore is highly reliable.

For performing a continuity test to determine whether or not a desired electric circuit is formed on a printed circuit board prior to mounting various electric parts thereon, there has been used an inspection apparatus in which a set of upper and lower contactor needles are shifted by means of pulse motors respectively to inspect a printed circuit board set on a holder between said needles.

A contactor needle unit of this prior art apparatus is constructed as shown in FIG. 7. Namely, a contactor needle 90 is disposed in a guide hole formed in an insulating block 91 and urged against a circuit 94, printed on a substrate board 93 and consisting of a sheet copper, by a spring 92. A plain screw 95 is screwed into the upper open end of the guide hole in the insulating block 91, clamping a solderless terminal 96 between it and said insulating block. This plain screw 95 serves simultaneously as a stopper for the spring 92.

In such a construction, current flows from the terminal 96 through the plain screw 95, the spring 92 and the contactor needle 90 to the circuit 94. However, the prior art apparatus has had the serious drawback that the electrical contact between the plain screw 96 and the spring 92 and/or between the spring 92 and the contactor needle 90 is occasionally broken due to the shape of th cut end of the spring 92 or bouncing of the spring 92 at the moment when the contactor needle 90 contacts the circuit 94, or otherwise the electrical continuity of the component parts is rendered very instable by the dust existing between the adjoining parts. It has had the additional drawback that the use of the solderless terminal makes it impossible to reduce the interval between the contactor needles when an inspection head having a plurality of contactor needles is produced, and therefore, the inspection of mounting holes for extremely small parts is impossible.

An embodiment of the present invention will be described hereunder with reference to the accompanying drawings, in which.

Figure 1:
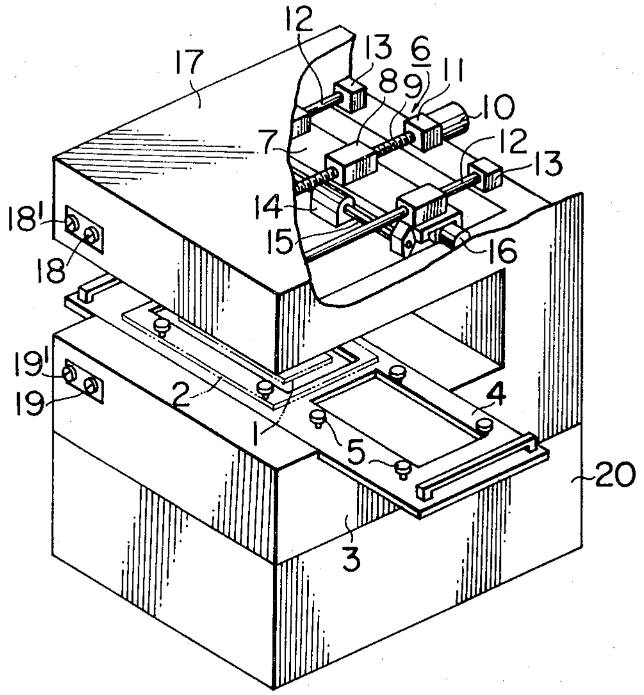
FIG. 1 is a perspective view, partially broken away, of an embodiment of the printed circuit board inspection apparatus according to the present invention.

Numeral 1 designates a printed circuit board to be inspected which is held at the central portion of a holder 2. The holder 2 is secured to a slide table 4 by means of screws 5, which slide table is slidably received in a groove formed in the upper surface of a cover 3 on top of a lower inspection head for reciprocal movement therein. An upper inspection head is spaced above the printed circuit board 1 and has provided therein a driving unit 6 shown in FIG. 1 and including longitudinal and transverse shifting mechanisms.

Namely, the driving unit 6 is constructed as follows: A longitudinal shifting block 7 is driven from a pulse motor 10 through a nut 8, provided thereon, and a screw shaft 9. Numeral 11 designates bearings supporting the screw shaft 9, 12 guide rods for the longitudinal shifting block 7, and 13 brackets supporting said guide rods 12. A transverse shifting block 14 is driven from a pulse motor 16 mounted on the longitudinal shifting block 7, while being guided by a guide rod 15 secured to the longitudinal shifting block 7. Numeral 17 designates a cover for the driving unit 6; 18, 18' dial gauges by which the restoration of the upper inspection head to the origin is confirmed; and 19, 19' dial gauges by which the restoration of the lower inspection head to the origin is confirmed. Numeral 20 designates a lower frame accommodating an electrical control unit and a pneumatic pressure unit.

Figure 2:
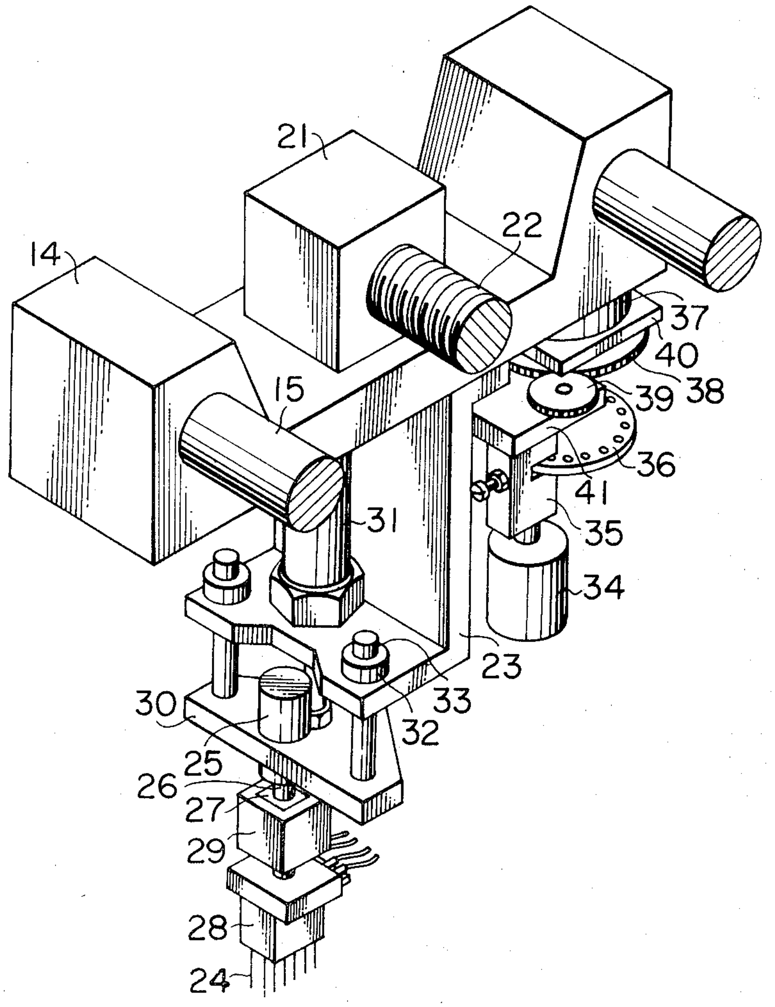
FIG. 2 is a perspective view of the upper inspection head of the apparatus.

The upper inspection head will b described in detail hereunder: The upper inspection head, as shown in FIG. 2, is mounted on a bracket 23 connected to the underside of the transverse shifting block 14 which is shifted transversely by a screw shaft 22 through a nut 21 while being guided by the guide rods 15.

Contactor needles 24 are mounted at their upper portions in a block 28 which is connected to one end of a slide block 27, the other end of which is connected to a rod 26 of an air cylinder 25. The slide block 27 is held against rotation by a rectangular guide 29.

The air cylinder 25 is fixedly mounted on a movable plate 30. The movable plate 30 is moved vertically by a separate large stroke air cylinder 31 fixedly mounted on the bracket 23, while being guided by guide means including slide ball bushes 32 on said bracket 23 and slide rods 33 fixed to said movable plate 30, thereby to providing for replacement of the printed circuit board.

A control unit controlling the operation of the air cylinder 25 is also mounted on the underside of the transverse shifting block 14 in the embodiment shown. This control unit comprises an air pilot type directional control valve 34, a sensor 35 to supply a pilot pressure to said directional control valve 34, a perforated disc 36 to intermittently cut off an air supply to said sensor 35, a pulse motor 37 to drive said perforated disc 36 and power transmission gears 38, 39, all of which are supported on brackets 40, 41. Although the position of the control unit is not necessarily restricted to the position shown, it is preferable that the control unit is located close to the contactor needle operating small stroke air cylinder 25.

Figure 3:
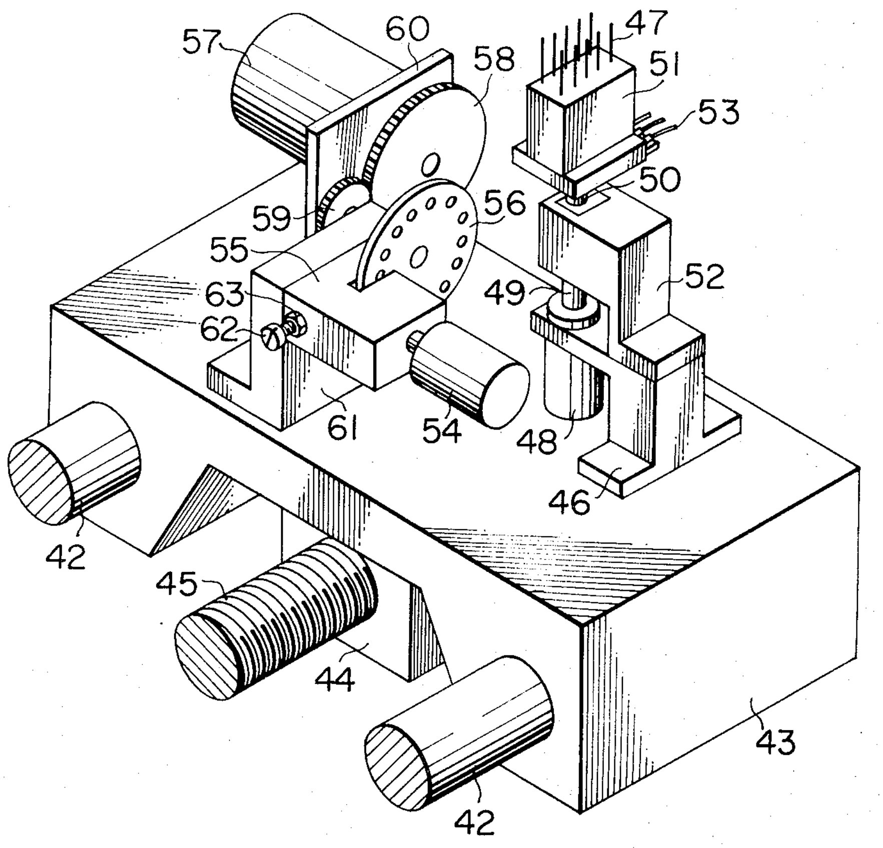
FIG. 3 is a perspective view of the lower inspection head of the apparatus.

The lower inspection head is constructed as shown in FIG. 3. Namely, the lower inspection head is mounted on a bracket 46 which is fixed on the upper surface of a transverse shifting block 43. The transverse shifting block 43 is shifted transversely by a screw shaft 45 through a nut 44 while being guided by guide rods 42.

Contactor needles 47 are mounted at their lower portions in a slide block 50 which is connected to one end of a rod 49 of a small stroke air cylinder 48. The slide block 50 is held against rotation by a rectangular guide 52. Numeral 53 designates terminals for supplying current to the contactor needles 47. A control unit controlling the operation of the air cylinder 48 is also mounted on the upper surface of the transverse shifting block 43 in the embodiment shown. Similar to the control unit for the upper inspection head, this control unit comprises a directional control valve 54, a sensor 55, a perforated disc 56, a pulse motor 57 and gears 58, 59, all of which are supported on brackets 60, 61. Numeral 62 designates a throttle valve to regulate the flow rate of air supplied from the sensor 55.

Figure 4:
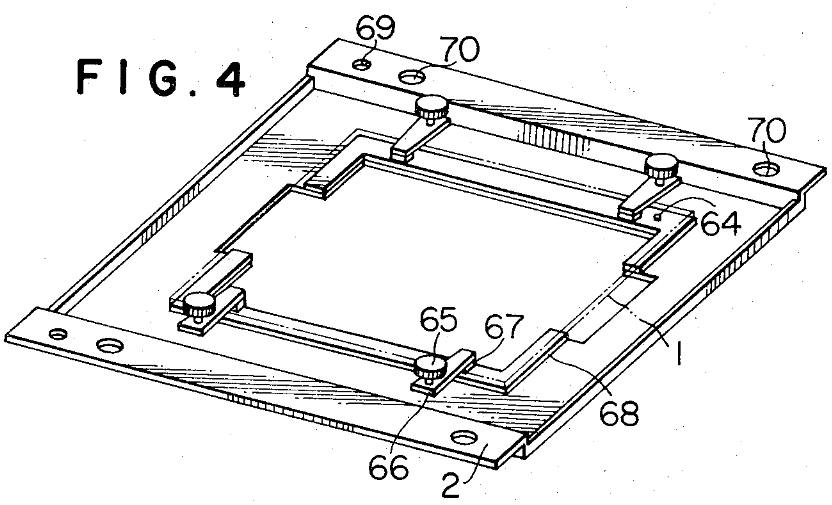
FIG. 4 is a perspective view of the printed circuit board holder of the apparatus.

Now, the construction of the printed circuit board holder 2 will be described with reference to FIG. 4. The printed circuit board 1 is positioned by positioning pins 64 and then fixed in its position by holder arms 66 which are clamped to the holder 2 by screws 65 respectively. Each screw 65 has a spring therein and the printed circuit board 1 is held on the holder 2 under a suitable pressure by the biasing force of said spring. The portion of each holder arm 66 which is brought into contact with the printed circuit board 1 and the edge portion of the holder 2 which is brought into contact with the printed circuit board 1 have electric insulating materials 67, 68 attached thereto respectively. The holder 2 is fixed on the slide table 4 by means of screw holes 70 after its position is determined by positioning holes 69.

Figure 5:
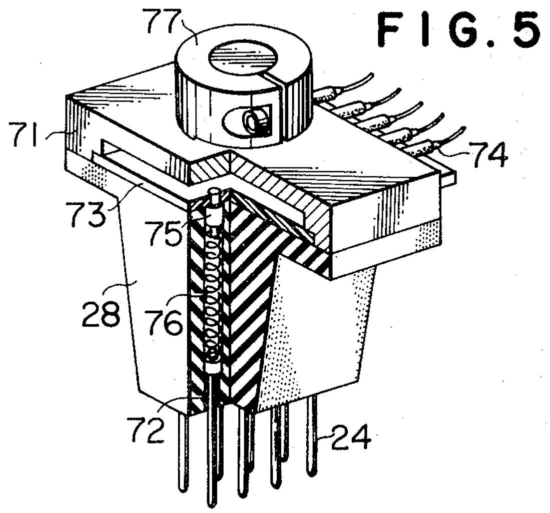
FIG. 5 is a perspective view of the contactor needle unit, partially in section to show the essential portion thereof.

The contactor needle unit incorporated in each of the upper and lower inspection heads is constructed as shown in FIG. 5. Namely, the contactor needles 24 are mounted at one end in a block 28 made of electrically insulating material and fixed to a holder 71. Each contactor needle is guided by a bush 72. In order to conduct current from terminals 74 to the respective contactor needles 24, a printed circuit plate 73 is disposed and and fixed between a holder 71 and the block 28. Therefore, a current is supplied to the contactor needles 24 through the terminals 74, the printed circuit plate 73, leads 75 and springs 76. The portions of the contactor needle 24 and the lead 75 which are in contact with the spring 76 are provided with a cylindrical or conical projection respectively so as to increase the contacting effect.

The contactor needle unit of the construction described above is secured to the slide block 27 (FIG. 2) by means of a clamp 77.

Figures 6, 7:
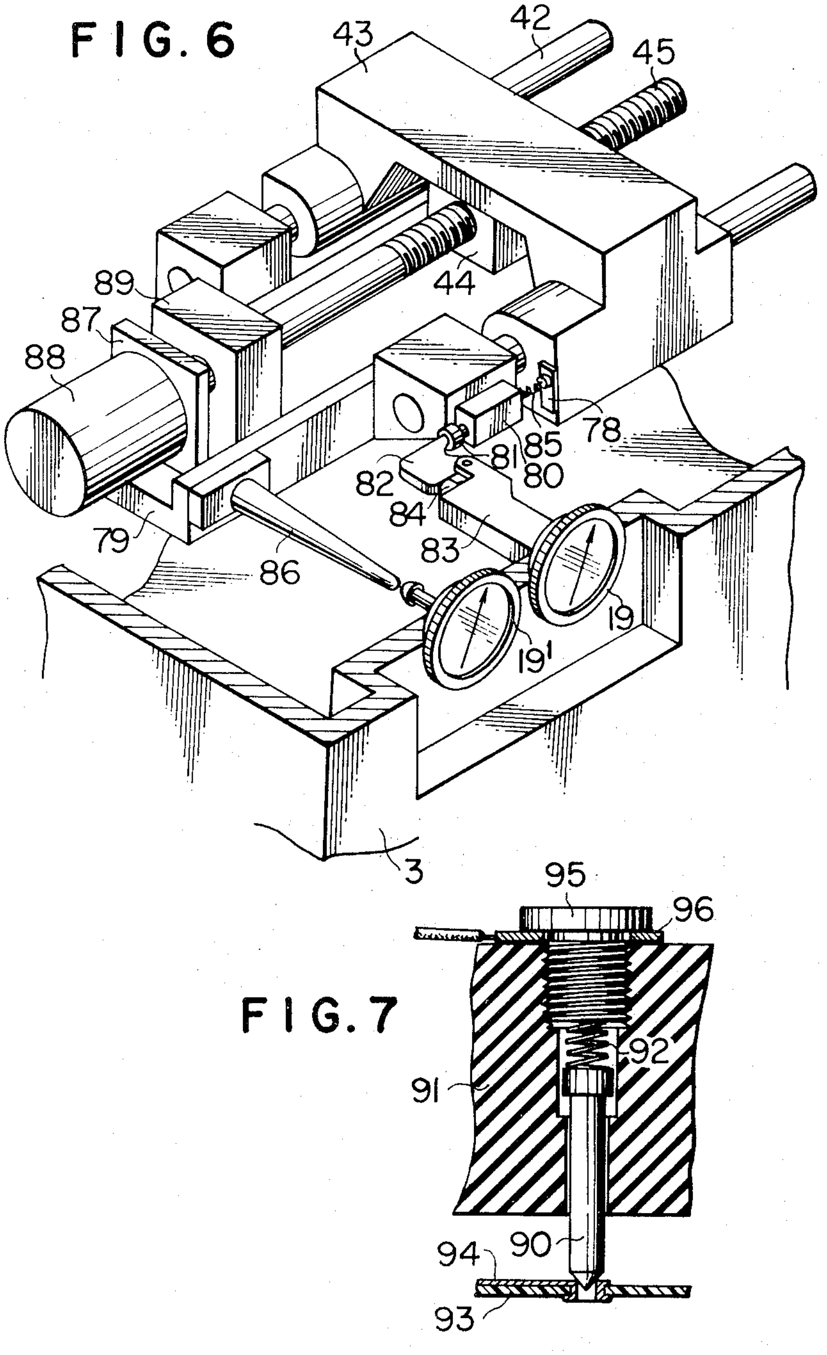
FIG. 6 is a perspective view of the origin restoration confirmation mechanism for the lower inspection head.
FIG. 7 is a sectional view of the contactor needle unit of a conventional circuit board inspection apparatus.

Finally, a mechanism for confirming the restoration of the upper or lower inspection head to the origin will be described with reference to FIG. 6 in which is shown the origin restoration confirmation mechanism for the lower inspection head. The transverse shifting block 43 already described with reference to FIG. 3 is provided at one end thereof with an abutment 78 for abutting engagement with a rod 81 which is guided by a guide block 80 connected to the shifting block 79. Movement of the rod 81 is read by the dial gauge 19 through a shaft 84 which is guided by a pivotable plate 82 and a bearing 83. A spring 85 is mounted over the rod 81 to impart a restoration force thereto. On the other hand, a rod 86 is provided on the longitudinal shifting block 79 and movement of said rod 86 in the restoration of said longitudinal shifting block 79 to the origin is read by the dial gauge 19'. Numeral 87 designates a bracket for mounting a pulse motor 88 thereon, and 89 designates a bearing for the screw shaft 45.

While the visually legible dial gauges 18, 18', 19, 19' are used in the embodiment shown, it is to be understood that electric micrometers or dial gauges generating electric signals may be used instead. The use of such micrometers or dial gauges is advantageous not only in that an error in amount of shifting of the head in one cycle of operation can be learned but also in that such error can be automatically corrected.

In the printed circuit board inspection apparatus of the invention described herein, a positive contact can be obtained and the contact resistance can be minimized between the contactor needles and the springs and between the springs and the leads, owing to the construction described above and therefore, the reliability of electrical continuity of the component parts can be enhanced. Furthermore, the interval between the contactor needles can be reduced owing to the use of a printed circuit plate as one component part between the contactor needles and the terminals, and inspection of a hole for a very small part is possible.

Thus, the inspection apparatus of the invention is capable of inspecting holes of a printed circuit board no matter how small they may be, with high reliability and hence is of great practical advantage.

What is claimed is:

1. A printed circuit board inspection apparatus comprising a table having a station provided with a window opening for carrying a printed circuit board with the opposite sides thereof exposed and an auxiliary station of a similar construction, inspection heads disposed above and below said table and mounted on shifting mechanisms including longitudinal and transverse shifting motors which are actuated by pulses for shifting said heads in the longitudinal and transverse directions, respectively, said inspection heads being vertically movably mounted and having a plurality of contactor needles, first air cylinder means for vertically moving at least one of said inspection heads into contact with said printed circuit board carried on said table, and second air cylin-der means for moving said one inspection head and said first air cylinder means as a unit in the vertical direction.

2. A printed circuit board inspection apparatus according to claim 1 wherein each of the inspection heads arranged above and below said table is associated with origins for longitudinal and transverse movements therefrom and means for confirming the restoration of said inspection heads to the origins upon completion of the inspection of one printed circuit board.

3. A printed circuit board inspection apparatus according to claim 1 wherein each of said inspection heads is vertically moved by an air cylinder operated by way of an air pilot type directional control valve and the pressure of said air pilot is obtained by a sensor including a baffle plate rotated by a second pulse motor and adapted to interrupt a compressed air flow.

4. A printed circuit board inspection apparatus according to claim 1 wherein each of said inspection heads comprises a block made of an electric insulating material and a plurality of contactor needles vertically movable and supported therein by springs and guided by bushes respectively, said contactor needles each having a projection so as to increase the contacting effect between the needle and the spring.

5. A printed circuit board inspection apparatus according to claim 4, wherein each of said inspection heads comprises a block made of an electric insulating material carrying a plurality of said contactor needles, springs vertically movable and supporting said contactor needles respectively, leads supporting said springs respectively, a holder, a printed circuit plate secured between said holder and said block and electrically connected with said contactor needles through said springs and said leads, and current conducting terminals provided on said printed circuit plate.

6. A printed circuit board inspection apparatus comprising a table having a station provided with a window opening for carrying a printed circuit board with the opposite sides thereof exposed and an auxiliary station of a similar construction, inspection heads disposed above and below said table and mounted on shifting mechanisms including longitudinal and transverse shifting motors which are actuated by pulses for shifting said heads in the longitudinal and transverse directions, respectively, said inspection heads being vertically movably mounted and having a plurality of contactor needles, first air cylinder means for vertically moving at least one of said inspection heads into contact with said printed circuit board carried on said table, and second air cylinder means for moving said one inspection head and said first air cylinder means as a unit in the vertical direction, a point of origin being provided for the longitudinal and transverse movements of the inspection heads, means for returning the inspection heads to said point of origin when the inspection of one printed circuit board is completed, said returning means comprising indicating scales which are actuated by said shifting mechanisms for indicating the exact positions of said inspection heads near the point of origin.

* * * * *